US005453152A

United States Patent [19]

Mazzola et al.

[11] Patent Number: 5,453,152

[45] Date of Patent: Sep. 26, 1995

[54] WALLPAPER APPLICATOR APPARATUS

[76] Inventors: Joseph Mazzola; Lisa Mazzola, both of 295 Leonard Ave., Staten Island, N.Y. 10314

[21] Appl. No.: 238,699

[22] Filed: May 5, 1994

[51] Int. Cl.[6] .......... B32B 31/00

[52] U.S. Cl. .......... 156/577; 156/523; 156/579; 242/422.4; 242/588.2

[58] Field of Search .......... 156/523, 524, 156/526, 527, 574, 577, 579, 71; 242/422.4, 588.2

[56] References Cited

U.S. PATENT DOCUMENTS

| | | | |
|---|---|---|---|
| 3,979,242 | 9/1976 | Holland et al. | 156/71 |
| 4,210,485 | 7/1980 | Lake | 156/577 |
| 4,248,392 | 2/1981 | Parry | 242/96 |
| 4,530,473 | 7/1985 | Parry | 242/96 X |
| 4,711,682 | 12/1987 | Barbe et al. | 156/71 |
| 4,759,441 | 7/1988 | Leurck | 206/373 |
| 4,806,184 | 2/1989 | Shannon | 156/71 |
| 4,834,312 | 5/1989 | Riemenschneider, III | 242/96 |
| 5,280,869 | 1/1994 | Ricci | 242/96 X |

*Primary Examiner*—James J. Engel

[57] ABSTRACT

A new and improved wallpaper applicator apparatus includes a shaft assembly that includes a paper-holding portion and an axle portion. A tubular handle assembly is adapted to receive the axle portion of the shaft assembly. The handle assembly includes a tubular wall which includes an inner bearing surface that is in contact with the axle portion of the shaft assembly when the shaft assembly rotates. The tubular wall also includes an outer hand grip portion adapted to be held by a user. An annular circular drip pan assembly is connected to the handle assembly. The annular circular drip pan assembly is adapted receive drippings from a wet roll of wallpaper when the wet roll of wallpaper is installed on the paper-holding portion of the shaft assembly and when the paper-holding portion is oriented above the axle portion. The paper-holding portion of the shaft assembly contains a slot adapted to receive a first free end of a roll of wallpaper. The annular circular drip pan assembly and the handle assembly are formed as a unified, integrated structure. The tubular wall of the handle assembly is comprised of a flexible material which permits the inner bearing surface of the handle assembly to be pressed against the axle portion of the shaft assembly with controlled pressure by the hand of the user for controlling tension of wallpaper that is being dispensed from a roll of wallpaper supported by the paper-holding portion of the shaft assembly.

3 Claims, 2 Drawing Sheets

WALLPAPER APPLICATOR APPARATUS

BACKGROUND OF THE INVENTION

1. Field of the Invention

The present invention relates generally to devices for applying wallpaper to a wall and, more particularly, to a hand-held device for applying the wallpaper.

2. Description of the Prior Art

In the art of hanging wallpaper, the application of border paper is often employed. Border paper is applied to wall surfaces near where the wall and the ceiling intersect. Because border paper is installed near the ceiling, it is difficult for many persons to apply the border paper. In this respect, it would be desirable if a device were provided which aids in the installation of border paper.

Most often, wallpaper is installed in a vertical orientation. However, border paper is an exception and is applied in a horizontal manner. In this respect, it would be desirable if a device were provided that aids in the application of wallpaper in a horizontal manner.

Applying wallpaper is often a wet and messy undertaking. Wallpaper is often applied with a water-based adhesive paste, and water drippings are often a consequence of wallpaper application. In this respect, it would be desirable if a device were provided that catches water drippings during wallpaper installation.

During the application of wallpaper, the wallpaper must often be placed under tension during the application process. The applying of tension is important to prevent air bubbles from being trapped under the wallpaper and is important prevent the wallpaper from wrinkling. In this respect, it would be desirable if a device were provided which enables tension to be applied to wallpaper as it is being applied to a wall surface.

Throughout the years, a number of innovations have been developed for facilitating the application of wallpaper on a wall surface, and the following U.S. patents are representative of some of those innovations: U.S. Pat. Nos. 3,979,242; 4,210,485; 4,711,682; 4,759,441; and 4,806,184. More specifically, U.S. Pat. No. 3,979,242 discloses a wallpaper dispenser and method of operation that requires the dispenser to be maintained in a horizontal orientation. If this is not done, the liquid adhesive contained in the dispenser would spill out of the dispenser. Maintaining the wallpaper dispenser in such a horizontal orientation may difficult and inconvenient. In this respect, it would be desirable if a device were provided for applying wallpaper which does not need to be maintained in a horizontal orientation during the wallpaper installation process.

U.S. Pat. No. 4,210,485 discloses a wallpaper applicator that permits single-handed application of the wallpaper and that employs two rollers. The two rollers and their accompanying support apparatus presents a relatively complex device. In this respect, it would be desirable if a device were provided which does not employ two rollers.

U.S. Pat. No. 4,711,682 discloses a wallpaper applicator in which the wallpaper is contained within a housing provided by the applicator. A disadvantage of this device is that the wallpaper is not readily accessible to the person applying the wallpaper because of the obstructive nature of the housing. Moreover, this device is used in a vertical wallpaper installation process. It does not appear to be adaptable to a horizontal installation process for wallpaper. In this respect, it would be desirable if a device were provided that facilitated installation of wallpaper without employing an exterior housing.

U.S. Pat. No. 4,759,441 discloses a combination tool that is employed for facilitating application of wallpaper. The tool has the form of a box and includes a plurality of hand-held implements. Each one of the implements must be applied in succession. Such a complex device and method of use is disadvantageous. In this respect, it would be desirable if a device were provided for installing wallpaper that does not employ a plurality of hand-held implements.

U.S. Pat. No. 4,806,184 discloses a wallpaper applicator that includes an applicator roller, a tensioning assembly, a handle, and a structural support for supporting all of the other components. To avoid the complexities of having a separate and distinct handle, a separate and distinct tensioning assembly, and a separate and distinct applicator roller, it would be desirable if a device were provided for installing wallpaper which does not include a separate and distinct handle and a separate and distinct tensioning assembly.

Thus, while the foregoing body of prior art indicates it to be well known to use devices to aid in installing wallpaper, the prior art described above does not teach or suggest a wallpaper applicator apparatus which has the following combination of desirable features: (1) aids in the installation of border paper on a wall; (2) aids in the application of wallpaper in a horizontal manner; (3) catches water drippings during wallpaper installation; (4) enables tension to be applied to wallpaper as it is being applied to a wall surface; (5) does not need to be maintained in a horizontal orientation during the wallpaper installation process; (6) does not employ two rollers; (7) does not employ an exterior housing; (8) does not employ a plurality of hand-held implements; and (9) does not include a separate and distinct handle and a separate and distinct tensioning assembly. The foregoing desired characteristics are provided by the unique wallpaper applicator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved wallpaper applicator apparatus which includes a shaft assembly that includes a paper-holding portion and an axle portion. A tubular handle assembly is adapted to receive the axle portion of the shaft assembly. The handle assembly includes a tubular wall which includes an inner bearing surface that is in contact with the axle portion of the shaft assembly when the shaft assembly rotates. The tubular wall also includes an outer hand grip portion adapted to be held by a user. An annular circular drip pan assembly is connected to the handle assembly. The annular circular drip pan assembly is adapted receive drippings from a wet roll of wallpaper when the wet roll of wallpaper is installed on the paper-holding portion of the shaft assembly and when the paper-holding portion is oriented above the axle portion.

The paper-holding portion of the shaft assembly contains a slot adapted to receive a first free end of a roll of wallpaper. The tubular handle assembly includes an end wall portion for supporting a proximal end of the axle portion of the shaft assembly. The end wall portion of the handle assembly is concavely shaped, and the proximal end of the axle portion of the shaft assembly is complementarily convexly shaped.

The annular circular drip pan assembly and the handle assembly are formed as a unified, integrated structure. The annular circular drip pan assembly includes an inner wall attached to the handle assembly and located adjacent to the shaft assembly. A floor portion adjacent to the inner wall, and an outer wall adjacent to the floor portion.

The tubular wall of the handle assembly is comprised of a flexible material which permits the inner bearing surface of the handle assembly to be pressed against the axle portion of the shaft assembly with controlled pressure by the hand of the user for controlling tension of wallpaper that is being dispensed from a roll of wallpaper supported by the paper-holding portion of the shaft assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved wallpaper applicator apparatus which has all of the advantages of the prior art and none of the disadvantages.

It is another object of the present invention to provide a new and improved wallpaper applicator apparatus which may be easily and efficiently manufactured and marketed.

It is a further object of the present invention to provide a new and improved wallpaper applicator apparatus which is of durable and reliable construction.

An even further object of the present invention is to provide a new and improved wallpaper applicator apparatus which is susceptible of a low cost of manufacture with regard to both materials and labor, and which accordingly is then susceptible of low prices of sale to the consuming public, thereby making such wallpaper applicator apparatus available to the buying public.

Still yet a further object of the present invention is to provide a new and improved wallpaper applicator apparatus which aids in the installation of border paper on a wall.

Still another object of the present invention is to provide a new and improved wallpaper applicator apparatus that aids in the application of wallpaper in a horizontal manner.

Yet another object of the present invention is to provide a new and improved wallpaper applicator apparatus which catches water drippings during wallpaper installation.

Even another object of the present invention is to provide a new and improved wallpaper applicator apparatus that enables tension to be applied to wallpaper as it is being applied to a wall surface.

Still a further object of the present invention is to provide a new and improved wallpaper applicator apparatus which does not need to be maintained in a horizontal orientation during the wallpaper installation process.

Yet another object of the present invention is to provide a new and improved wallpaper applicator apparatus that does not employ two rollers.

Still another object of the present invention is to provide a new and improved wallpaper applicator apparatus which does not employ an exterior housing.

Yet another object of the present invention is to provide a new and improved wallpaper applicator apparatus that does not employ a plurality of hand-held implements.

Still a further object of the present invention is to provide a new and improved wallpaper applicator apparatus that does not include a separate and distinct handle and a separate and distinct tensioning assembly.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved wallpaper applicator apparatus embodying the principles and concepts of the present invention will be described.

Figure 1:
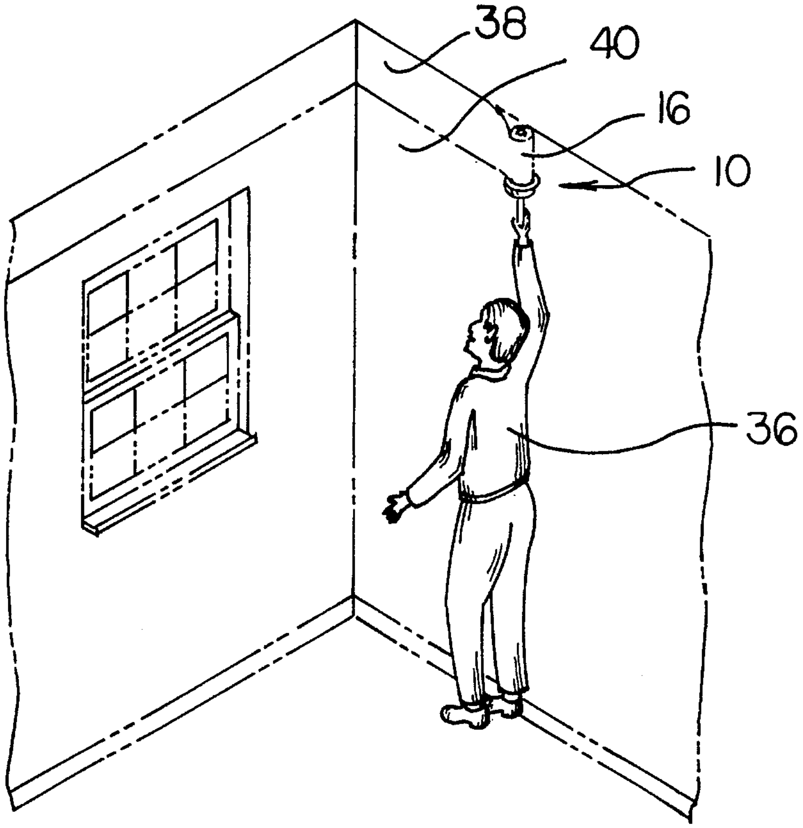
FIG. 1 is a perspective view showing a preferred embodiment of the wallpaper applicator apparatus of the invention being used by a person to install border paper on a wall surface.
Figure 2:
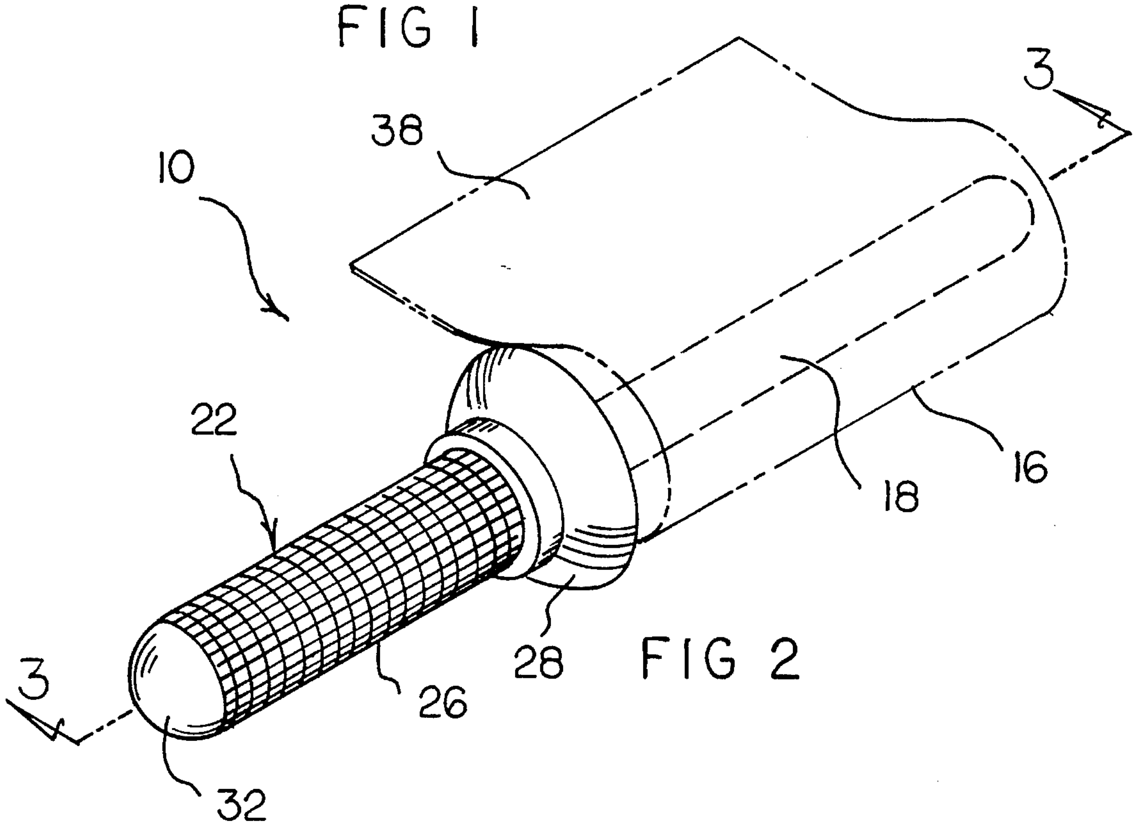
FIG. 2 is an enlarged perspective view of the embodiment of the wallpaper applicator apparatus shown in FIG. 1.
Figure 3:
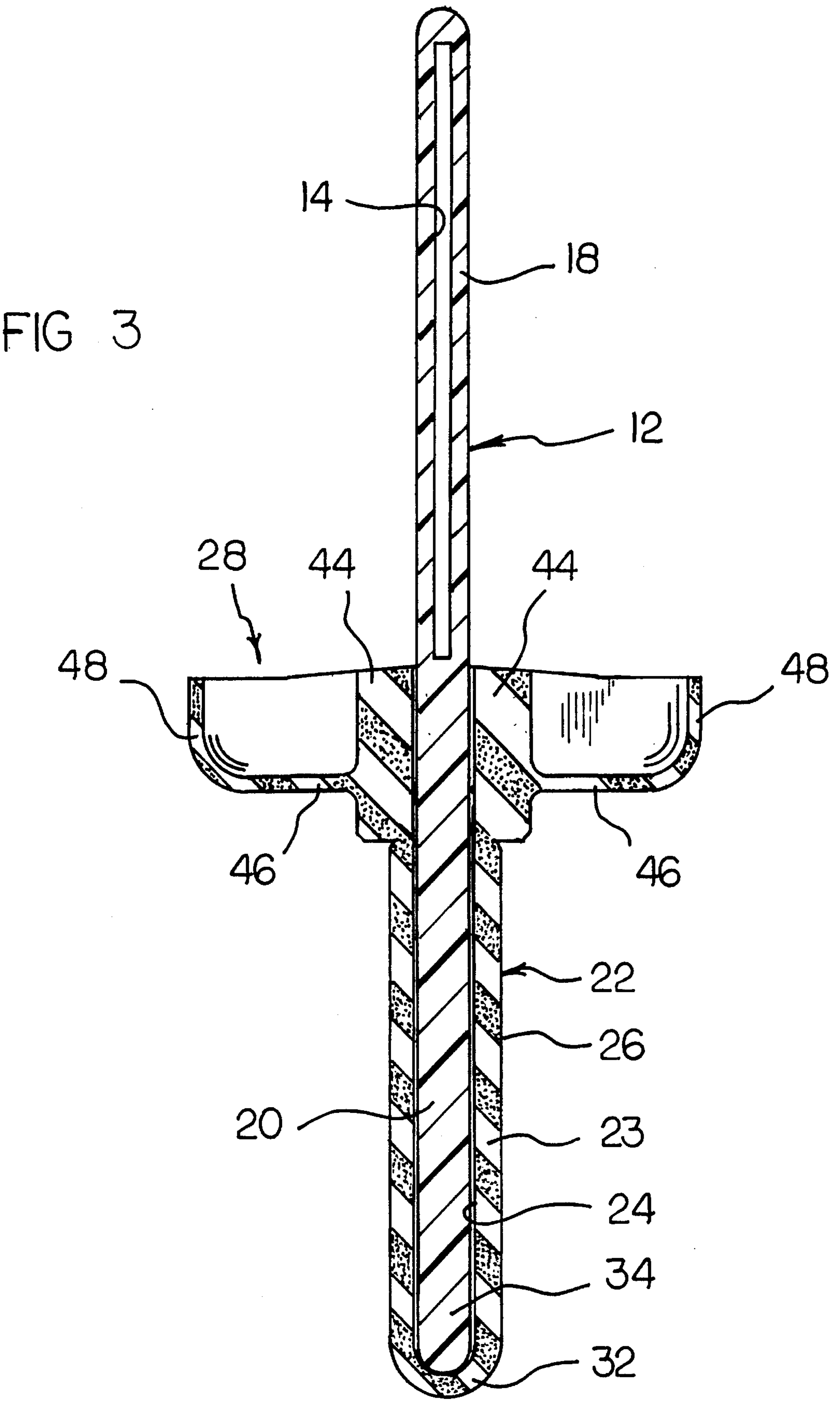
FIG. 3 is an enlarged cross-sectional view of the embodiment of the wallpaper applicator apparatus of FIG. 2 taken along line 3—3 thereof.

Turning to FIGS. 1–3, there is shown an exemplary embodiment of the wallpaper applicator apparatus of the invention generally designated by reference numeral 10. In its preferred form, wallpaper applicator apparatus 10 includes a shaft assembly 12 which includes a paper-holding portion 18 and an axle portion 20. A tubular handle assembly 22 is adapted to receive the axle portion 20 of the shaft assembly 12. The handle assembly 22 includes a tubular wall 23 which includes an inner bearing surface 24 that is in contact with the axle portion 20 of the shaft assembly 12 when the shaft assembly 12 rotates. The tubular wall 23 also includes an outer hand grip portion 26 adapted to be held by a user. An annular circular drip pan assembly 28 is connected to the handle assembly 22. The annular circular drip pan assembly 28 is adapted receive drippings from a wet roll of wallpaper 16 when the wet roll of wallpaper 16 is installed on the paper-holding portion 18 of the shaft assembly 12 and when the paper-holding portion 18 is oriented above the axle portion 20.

The paper-holding portion 18 of the shaft assembly 12 contains a slot 14 adapted to receive a first free end of a roll-of wallpaper 16. The tubular handle assembly 22 includes an end wall portion 32 for supporting a proximal end 34 of the axle portion 20 of the shaft assembly 12. The end wall portion 32 of the handle assembly 22 is concavely shaped, and the proximal end 34 of the axle portion 20 of the shaft assembly 12 is complementarily convexly shaped.

The annular circular drip pan assembly 28 and the handle assembly 22 are formed as a unified, integrated structure. The annular circular drip pan assembly 28 includes an inner wall 44 attached to the handle assembly 22 and located adjacent to the shaft assembly 12. A floor portion 46 adjacent to the inner wall 44, and an outer wall 48 adjacent to the floor portion 46.

The tubular wall 23 of the handle assembly 22 is comprised of a flexible material which permits the inner bearing surface 24 of the handle assembly 22 to be pressed against the axle portion 20 of the shaft assembly 12 with controlled pressure by the hand of the use 36 for controlling tension of wallpaper that is being dispensed from a roll of wallpaper 16 supported by the paper-holding portion 18 of the shaft assembly 12. Thus, the handle assembly 22 serves two separate and distinct functions with one common structure. The handle assembly 22 serves as a bearing for the rotating shaft assembly 12, and the handle assembly 22 serves as a wallpaper tensioning device.

In use, a roll of border wallpaper 16 is installed on the paper-holding portion 18 of the shaft assembly 12. More specifically, a first free end of the border wallpaper is inserted into the slot 14 in the paper-holding portion 18. The handle assembly 22 is grasped by a user 36, and the wallpaper applicator apparatus 10 of the invention is oriented in a vertical orientation. The second free end 38 of the wallpaper is pressed onto a wall surface 40 at a corner between two walls at the intersection of the walls with the ceiling. Then, the wallpaper applicator apparatus 10 of the invention is moved horizontally. As the wallpaper applicator apparatus 10 of the invention is moved horizontally, the roll of wallpaper 16 unrolls, and the unrolled border wallpaper is pressed onto the wall surface 40 by the user 36. To control tension of the wallpaper as it is payed out from the roll of wallpaper 16, the tubular wall 23 of the handle assembly 22 is made of flexible plastic or rubber material, and the handle assembly 22 is squeezed by the hand of the user 36 to increase the frictional forces between the inner bearing surface 24 of the handle assembly 22 and the axle portion 20 of the shaft assembly 12. The greater the pressure of the hand squeezing the handle assembly 22, the greater the frictional forces generated, and the greater the tension on the wallpaper as it is payed out from the paper-holding portion 18 of the shaft assembly 12.

The roll of wallpaper 16 is generally wet, and water that drips off of the roll of wallpaper 16 is caught by the annular circular drip pan assembly 28 that has an inner wall 44 adjacent to the shaft assembly 12, a floor portion 46, and an outer wall 48. The floor portion 46 is located between the inner wall 44 and the outer wall 48.

Once the roll of wallpaper 16 has been applied to the wall surface 40, the first free end of the wallpaper is removed from the slot 14. The shaft assembly 12 can be removed from the annular circular drip pan assembly 28 and the handle assembly 22 simply by grasping the paper-holding portion 18 of the shaft assembly 12 and pulling the axle portion 20 of the shaft assembly 12 out from the handle assembly 22. Both the shaft assembly 12 and the combined handle assembly 22 and annular circular drip pan assembly 28 can readily be cleaned in water before they are reused or placed in storage.

The components of the wallpaper applicator apparatus of the invention can be made from inexpensive and durable metal, plastic, or rubber materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wallpaper applicator apparatus that is low in cost, relatively simple in design and operation, and which may advantageously be used to aid in the installation of border paper on a wall. With the invention, a wallpaper applicator apparatus is provided which aids in the application of wallpaper in a horizontal manner. With the invention, a wallpaper applicator apparatus is provided which catches water drippings during wallpaper installation. With the invention, a wallpaper applicator apparatus is provided which enables tension to be applied to wallpaper as it is being applied to a wall surface. With the invention, a wallpaper applicator apparatus is provided which does not need to be maintained in a horizontal orientation during the wallpaper installation process. With the invention, a wallpaper applicator apparatus is provided which does not employ two rollers. With the invention, a wallpaper applicator apparatus is provided which does not employ an exterior housing. With the invention, a wallpaper applicator apparatus is provided which does not employ a plurality of hand-held implements. With the invention, a wallpaper applicator apparatus is provided which does not include a separate and distinct handle and a separate and distinct tensioning assembly.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved wallpaper applicator apparatus, comprising:

a shaft assembly which includes a paper-holding portion and an axle portion, wherein said paper-holding portion of said shaft assembly contains a slot adapted to receive a first free end of a roll of wallpaper, a tubular handle assembly adapted to receive said axle portion of said shaft assembly and encompass said axle portion, wherein said handle assembly includes a tubular wall which includes an inner bearing surface that is in contact with said axle portion of said shaft assembly when said shaft assembly rotates, and which includes an outer hand grip portion adapted to be held by a user, wherein said tubular handle assembly includes an end wall portion for contacting and supporting a longitudinal proximal end of said axle portion of said shaft assembly, and wherein said tubular wall of said handle assembly is comprised of a flexible material which permits said inner bearing surface of said handle assembly to be pressed against said axle portion of said shaft assembly for controlling tension of wallpaper being dispensed from a roll of wallpaper installed on said paper-holding portion of said shaft assembly, and an annular circular drip pan assembly connected to said handle assembly, said annular circular drip pan assembly being adapted receive drippings from a wet roll of wallpaper when the wet roll of wallpaper is installed on said paper-holding portion of said shaft assembly and when said paper-holding portion is oriented above said axle portion, wherein said end wall portion of said handle assembly is concavely shaped, and said longitudinal proximal end of said axle portion of said shaft assembly is complementarily convexly shaped.

2. The apparatus described in claim 1 wherein said annular circular drip pan assembly and said handle assembly are formed as a unified, integrated structure.

3. The apparatus described in claim 1 wherein said annular circular drip pan assembly includes:

an inner wall attached to said handle assembly and located adjacent to said shaft assembly, a floor portion adjacent to said inner wall, and an outer wall adjacent to said floor portion.

* * * * *